(12) United States Patent
Thornton (10) Patent No.: US 9,689,511 B1
(45) Date of Patent: Jun. 27, 2017

(54) TIE WRAP PLASTIC ANCHOR ASSEMBLIES AND METHODS OF ASSEMBLY

(71) Applicant: THE MONADNOCK COMPANY, City of Industry, CA (US)

(72) Inventor: Klint Thornton, Rialto, CA (US)

(73) Assignee: The Monadnock Company, City of Industry, CA (US)

( * ) Notice: Subject to any disclaimer, the term of this patent is extended or adjusted under 35 U.S.C. 154(b) by 0 days.

(21) Appl. No.: 15/183,789

(22) Filed: Jun. 16, 2016

(51) Int. Cl.
*B65D 63/00* (2006.01)
*F16L 3/233* (2006.01)

(52) U.S. Cl.
CPC .................................. *F16L 3/233* (2013.01)

(58) Field of Classification Search
CPC ..................................................... F16L 3/233
USPC .......... 248/71, 73, 74.3, 231.9, 231.91, 499, 248/500; 211/85.5; 403/13, 14; 411/166
See application file for complete search history.

(56) References Cited

U.S. PATENT DOCUMENTS

| | | | |
|---|---|---|---|
| 3,250,505 A * | 5/1966 | Rodman, Sr. | F16L 3/23 248/49 |
| 3,424,317 A | 1/1969 | Singer | |
| 4,534,471 A | 8/1985 | Zahn | |
| 5,052,563 A | 10/1991 | Camp | |
| 5,730,399 A | 3/1998 | Baginski | |
| D414,403 S | 9/1999 | Coven | |
| 6,196,751 B1 | 3/2001 | Khokhar | |
| 6,533,226 B2 | 3/2003 | Geiger | |
| 6,718,597 B2 | 4/2004 | Geiger | |
| D496,851 S | 10/2004 | Stephen | |
| D497,100 S | 10/2004 | Stephen | |
| 6,880,787 B2 | 4/2005 | Stephen | |
| 6,880,788 B2 | 4/2005 | Stephen | |
| 6,884,014 B2 * | 4/2005 | Stone | F16B 5/0233 411/107 |
| 7,686,259 B2 | 3/2010 | Caveney | |
| 7,686,529 B1 * | 3/2010 | Le | B64G 1/646 403/78 |
| 7,726,922 B2 | 6/2010 | Slyter | |
| 7,770,852 B2 | 8/2010 | Caveney | |
| 8,829,353 B2 | 9/2014 | Homner | |

(Continued)

*Primary Examiner* — Gwendolyn Baxter
(74) *Attorney, Agent, or Firm* — Henricks, Slavin & Holmes LLP (57) ABSTRACT

A tie wrap anchor assembly and methods of assembly include a body member having an internal passageway and an outwardly extending structure. A fastener element includes a first threaded end portion, a second end portion and a flange member between the first and second end portions. A cylindrical member is configured to extend within the internal passageway and receive at one end the fastener element for positioning the body member between the flange member on the fastener element and a laterally extending element on the cylindrical member. In one configuration, the body member is freely pivotable relative to the cylindrical member, and in one configuration the cylindrical member has a head with a plurality of surfaces that can be used to turn the cylindrical member. A tie wrap anchor assembly can be assembled by positioning a body member over a cylindrical member and inserting a fastener element into an opening in the cylindrical member to position the body member between the fastener element and a surface on the cylindrical member to limit axial movement of the body member.

15 Claims, 5 Drawing Sheets

(56) References Cited

U.S. PATENT DOCUMENTS

| | | | | |
|---|---|---|---|---|
| 2004/0021042 A1* | 2/2004 | Stephen | ............... | F16B 35/06 248/68.1 |
| 2010/0266093 A1* | 10/2010 | Matsumoto | ............ | G21C 15/25 376/372 |
| 2013/0156527 A1 | 6/2013 | Hutchinson | | |

* cited by examiner

FIG. 10

TIE WRAP PLASTIC ANCHOR ASSEMBLIES AND METHODS OF ASSEMBLY

BACKGROUND

Field

These inventions relate to tie wrap anchor assemblies, including those with one or more plastic or nonmetal components, those that can accept cable ties for supporting cables, cable bundles, and other components on a support structure, and those that can be pivotable or self-aligning, as well as methods of assembly thereof.

Related Art

U.S. Pat. No. 6,880,787 teaches a ring-post fastener for securing wires, tubes or hoses having a post and a plurality of spokes projecting radially from the post to a ring. One or more objects can be bundled with a tie strap and affixed to the ring by projecting one end of the tie strap through a slot back on itself to be locked to its opposite end. One end of the fastener includes a male threaded portion for securing the post to a support surface, and the opposite end includes female threads for receiving a male fastener on a second ring-post fastener, for example for stacking ring post fasteners together. The ring-post fastener is not freely rotatable.

U.S. Pat. No. 7,686,259 teaches a ring post assembly having a free-spinning hub, and which can be stackable. The ring post assembly includes an outer member in the form of a hub and an inner member in the form of a threaded fastener snap fit into the hub. The hub has a plurality of rungs equidistantly spaced about the hub, and four notches at one end for accepting complementary fingers of an adjacent ring post assembly.

A first goal of one of the inventions is to have tie wrap anchor assemblies using freely rotatable anchor blocks allow self alignment and a more stable assembly in operation.

Another goal of one of the inventions is to make easier pre-assembly of components and modular assemblies or subassemblies. For example, a rotatable anchor block in a tie wrap anchor assembly may allow pre-attachment of the assembly to a wire harness, bundle or other targets structure to be supported, after which the assembly can be mounted to the support structure as a unit. Additionally, multiple handling surfaces can be incorporated into the assembly to allow more versatility in installation and maintenance.

These and other benefits will become more apparent with consideration of the description of the examples herein.

SUMMARY

The inventions relate to a tie wrap anchor assembly having a tie block extending along an axis between a first end and a second end with a passageway between the first and second tie block ends, and at least one holding structure extending outward of the tie block defining an aperture for receiving a tie wrap. The assembly includes a fastener element having a first threaded end portion, a second end portion opposite the first threaded end portion, and a flange extending substantially transverse to an axis extending between the first and second end portions. The assembly further includes an insert having an external surface configured to extend within the passageway of the tie block from the tie block first end toward the tie block second end, wherein the insert includes a first insert end and a second insert end opposite the first end and at least one of the first and second ends of the insert includes an opening extending axially of the insert, the first insert end including a head extending laterally outward of the insert, wherein the second end of the insert is configured for receiving at least one of the fastener element end portions. The fastener element flange and the insert head are spaced apart sufficiently that the tie block is axially positioned between the fastener element flange and insert head and a tie block movement is limited along its axis by the fastener element flange and the insert head.

In such a configuration, a tie block can be securely positioned between a portion of an insert and a portion of a fastener element, and the tie block can be positioned while still allowing the tie block to move, for example rotatably and/or axially.

In one example of a tie wrap anchor assembly, the passageway in the tie block is substantially cylindrical and has an inside dimension greater than an outside dimension of the insert such that the tie block is rotatable relative to the insert.

In a further example of a tie wrap anchor assembly, the tie block includes a plurality of holding structures defining respective apertures for receiving a respective tie wrap, wherein the plurality of holding structures are substantially symmetrically arranged relative to each other on the tie block.

The assembly may have a tie block including a stem having a rectangular cross-section with four corners and four sidewalls, for example for providing pillar support.

The assembly may be configured such that the second end portion of the fastener element includes a threaded portion, or another securement configuration.

The assembly may be configured wherein the fastener element includes a surface for receiving a disc having a wall for engaging a surface on the flange of the fastener element. The disc may be used for protecting the surface of an underlying support structure.

The assembly with the flange on the fastener element may include surfaces configured to assist in turning the fastener element. The surface may be used to assist in assembling the parts, and/or in installing or removing the assembly from a support structure, for example.

The assembly having a flange on the fastener element may include an outer dimension greater than an outer dimension of the second end portion of the tie block. A greater outer dimension may make easier grasping and/or manipulating the fastener element, protect one or more surfaces of the tie block, and/or provide a bearing surface against a support structure while allowing the tie block to remain spaced apart from the support structure.

The assembly may be configured so that the head on the first end portion of the insert includes at least one wrenching portion. A wrenching portion may be used for assembling the components, and/or in installing or removing the assembly from a support structure, for example.

The assembly may be configured such that at least one of the openings in the insert includes at least one surface for retaining a corresponding surface on the fastener element. The at least one surface for retaining a corresponding surface on the fastener element may include at least one of a tapped surface and an annular shoulder.

In a tie wrap anchor assembly, each of the openings in first and second end portions of the insert may include respective helicoil inserts.

The assembly may be configured such that the head of the insert and the flange of the fastener element are adapted together to limit axial movement of the tie block.

In another example of the inventions, a method of assembling a tie wrap anchor assembly includes positioning a tie block having a passageway and holding structures for receiving respective tie wraps about an insert so that a longitudinally extending portion of the insert extends into the passageway and so that a surface on the tie block can contact a laterally extending surface on the insert. A fastener element is engaged with the insert so that a laterally extending surface on the fastener element is on a side of the tie block opposite the laterally extending surface on the insert.

In one configuration, the method includes threading the fastener element into the insert.

These and other examples are set forth more fully below in conjunction with drawings, a brief description of which follows.

DETAILED DESCRIPTION

This specification taken in conjunction with the drawings set forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

As used herein, "substantially" shall mean the designated parameter or configuration, plus or minus 10%. However, it should be understood that terminology used for orientation or relative position, such as front, rear, side, left and right, upper and lower, and the like, may be used in the Detailed Description for ease of understanding and reference, and may not be used as exclusive terms for the structures being described and illustrated.

As used herein, "rotation" shall mean as movement more than 360°, and "pivoting" shall mean as movement over less than 360°.

An example of a tie wrap anchor assembly 100 (FIGS. 1-8) includes a body member in the form of a tie block 200, an internal member in the form of an insert or sleeve 300 and a fastener element in the form of a stud 400. The parts are assembled together to form the assembly, for example from a kit or from individual parts. The configurations improve manufacturability, and may include configurations providing flexibility in the application and assembly and maintenance of the assembly, including at lower cost.

In the illustrated example, the assembly extends longitudinally, for example on an axis 102, and the tie block is positioned between an end portion of the insert 300 and a flange or plate on the stud 400. The tie block is freely rotatable in this example.

The tie block 200 (FIGS. 1-8) includes a stem 204 and a shoulder section 206. The shoulder section 206 extends from a relatively flat top surface 208 at a first end 210 to one end of the stem 204 at an approximate midportion of the tie block 200. The stem extends from the shoulder section to a second end 212 of the tie block having a relatively flat bottom surface. The stem 204 and the shoulder section 206 in the illustrated example are rectangular, and specifically they are square in transverse cross-section, and the stem is smaller in side dimension or width than the shoulder section. The stem includes side surfaces 214 and corners 216, and also includes a slight draft so that opposite side surfaces 214 adjacent the shoulder section 206 are spaced wider apart than the opposite side surfaces at the second end surface 212. The square stem provides manual surfaces or wrenching surfaces to assist in holding the tie block or turning the tie block if desired.

A cylindrical wall 218 (FIGS. 4-6) defines a passageway 220 extending completely through the tie block and concentric with the central axis, from the first end portion 210 to the second end portion 212. In the illustrated configuration, the cylindrical wall 218 forms a right circular cylinder. A curved transition surface 222 extends between the top surface 208 and the cylindrical wall 218 as a lead in to make easier the insertion of the insert into the passageway 220.

Figure 1:
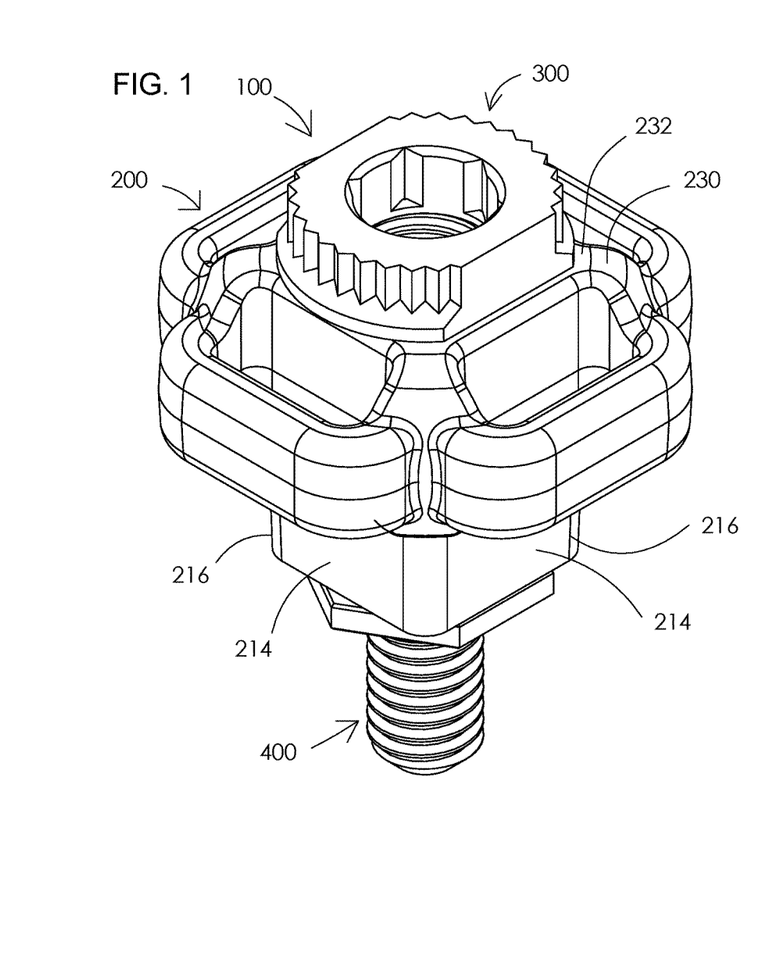
FIG. 1 is an upper isometric view of a tie wrap anchor assembly in accordance with one example described herein.
Figure 2:
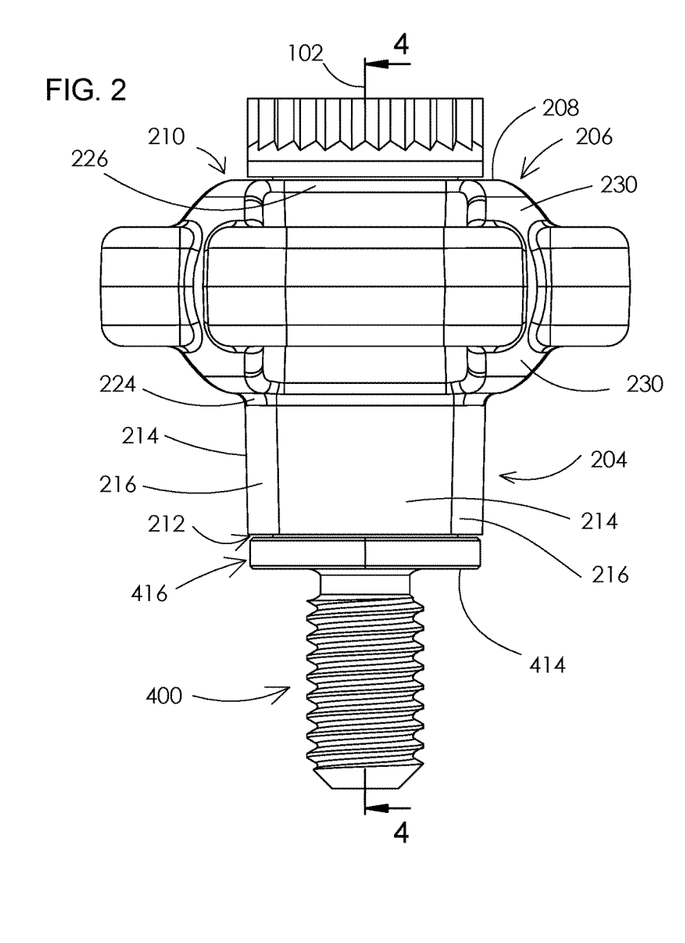
FIG. 2 is a side elevation view of the assembly of FIG. 1.

The shoulder section 206 is also substantially square except for intermediate curved transition walls 224 and 226 (FIG. 2). In the illustrated example, four holding structures 230 extend outward from the side surfaces 214 of the shoulder section. In the present example, each holding structure is identical to the other ones, and only one holding structure will be described.

Figures 3, 4, 5, 6:
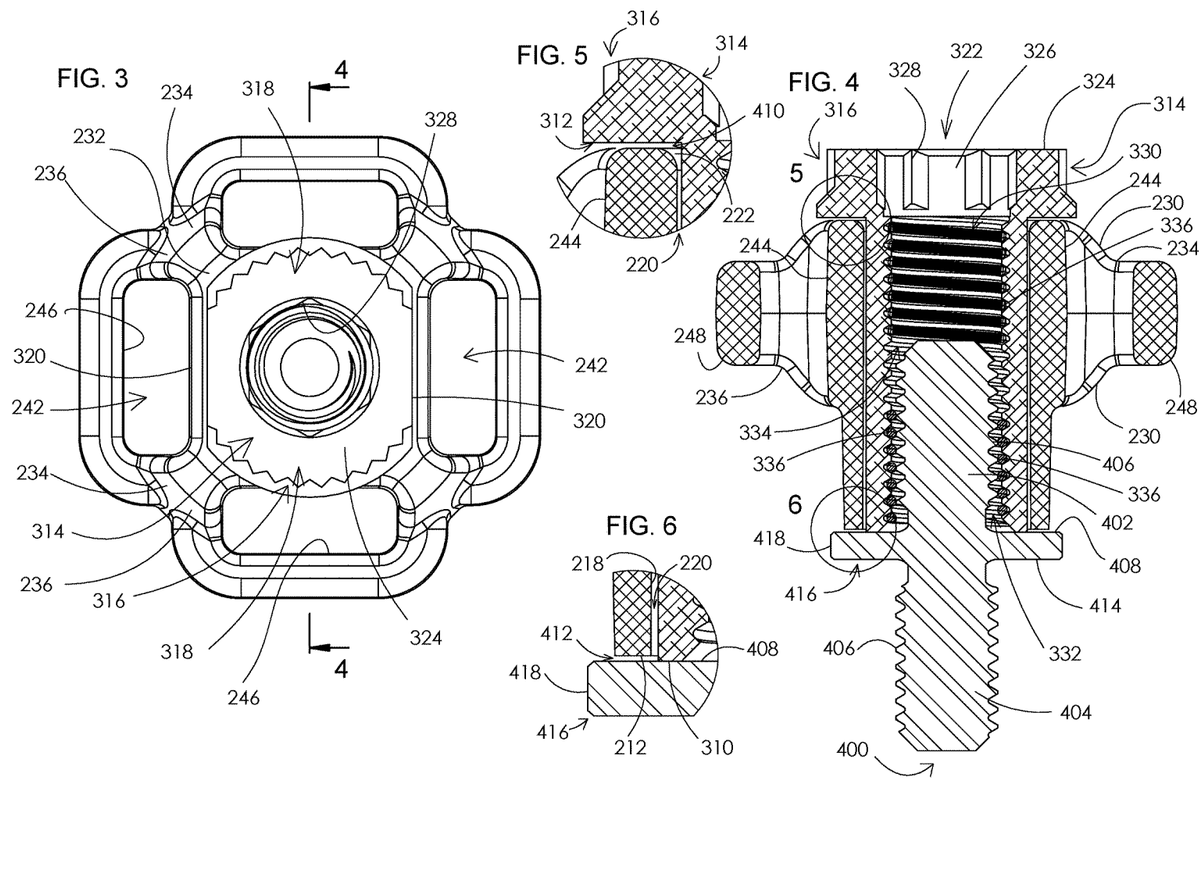
FIG. 3 is a top plan view of the assembly of FIG. 1.
FIG. 4 is a longitudinal cross section of the assembly of FIG. 1 taken along line 4-4 of FIG. 2.
FIG. 5 is a detail of a portion of the section of FIG. 4 taken at 5 of FIG. 4.
FIG. 6 is a detail of a portion of the section of FIG. 4 taken at 6 of FIG. 4.
Figure 7:
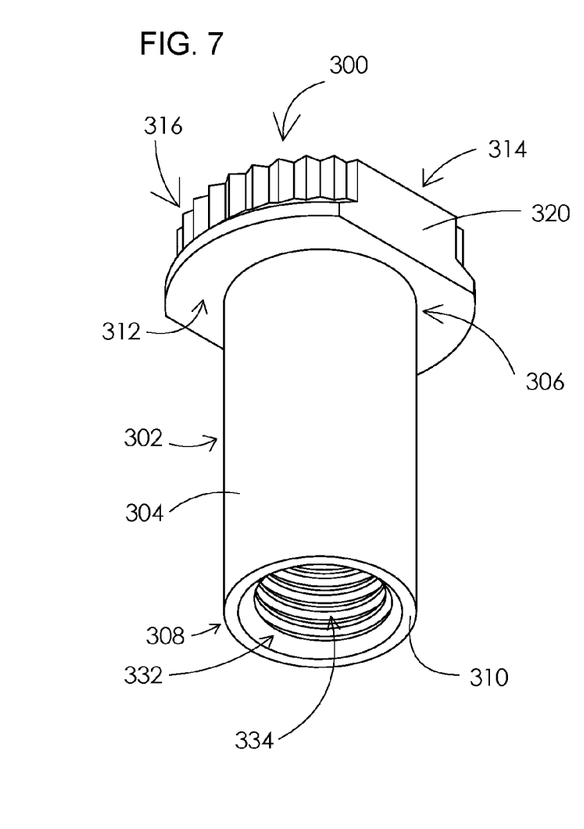
FIG. 7 is a lower isometric view of the insert.
Figure 8:
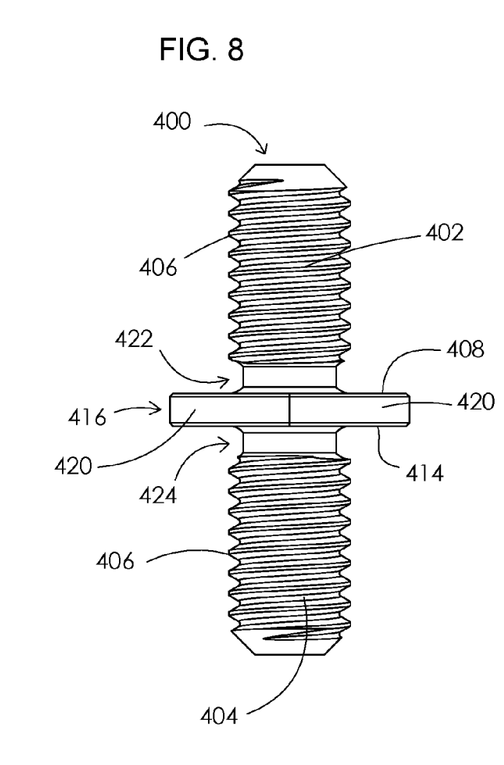
FIG. 8 is a side elevation view of a fastener component of the assembly of FIG. 1.

Each holding structure 230 comprises two arms 234 and 236, each extending approximately parallel to each other. A beam 248 joins the arms 234, 236 together, forming an aperture 242. Each beam is approximately centered axially in the shoulder section, and as can be seen in FIGS. 2 and 4, the arms 234 and 236 converge from a relatively large axial dimension adjacent the shoulder section to a smaller axial dimension at the beam 248. A cross-section of the beam is approximately rectangular with rounded corners. The beam provides an inside surface wall 246 that is substantially straight in a plane normal to the central axis of the assembly and can be straight in a plane perpendicular to the first plane, but can be curved. The straight inside surface wall 246 provides improved support for a tie wrap, for example for a tie wrap having a rectangular or planar configuration, and improved support may also be provided with a pivotable or rotatable tie block. If the tie wrap enters and exits the aperture 242 from one side, i.e. the tie wrap is not centered, then pivoting of the holding structure allows the aperture to self-align with the direction of the tie wrap, and the flat surface 246 of the tie wrap rests against the flat surface of the aperture, rather than across a corner.

In the exemplary illustrative configurations, the four holding structures 230 are distributed evenly or uniformly around a perimeter of the tie block. The four holding structures are positioned at the same axial position on the tie block, but one or more of the holding structures can be shifted axially relative to another one. In alternative configurations, the tie block can include only a single holding structure, a pair of holding structures, for example positioned on opposite sides or adjacent sides of the tie block, or a trio of holding structures. Also in the illustrated configuration, the four holding structures are identical in size, but one or more of the holding structures can be different in size relative to one or more of the other ones. One or more of the apertures can also be different in opening profile, for example other than rectangular.

The tie block includes also four corners 232 that cover a portion of two adjacent holding structures, in order to provide additional material against compressive loads, and to enhance the strength against compressive loads or pillar strength.

The tie block may be formed from a number of materials. In one example, the tie block is molded from an ASTM D6779 compliant nylon, and in the present example the tie block is monolithic. Other materials may be used for higher temperature or load applications, such as Polyetheretherketone.

The insert 300 (FIGS. 1-7) in the illustrated configuration includes a cylindrical shaft 302. The shaft extends a distance along an axis and includes an outer surface 304 forming a right circular cylinder from a first end 306 to a second end 308 terminating in an end surface 310. The end surface 310 is substantially flat, and extends in a plane substantially normal to the central axis of the insert. The end surface extends inward from the outer surface, such that the tie block second end is flangeless or has a maximum outer dimension approximately the same as the outer surface 304.

The outside diameter of the outer surface 304 of the insert is configured to be slightly less than the inside diameter of the wall 218 of the passageway 220 of the tie block 200. The outside diameter of the outer surface 304 and the inside diameter of the passageway 220 are selected so as to permit the desired rotation and axial movement of the tie block relative to the insert 300. Such rotation can help the tie block to be self-aligning. Alternatively, in another configuration, the dimensions can be selected or structures can be included to limit or prevent rotation of the tie block relative to the insert, such as the tie block can only pivot and cannot rotate.

The first end portion of the insert includes a head 314 extending laterally outward of and axially away from the first end 306 of the cylindrical shaft 302 in a way sufficient to limit the axial movement of the tie block in the axial direction of the insert. Axial movement of the tie block in the present example is limited by contact between the top surface 208 of the tie block and the under head surface 312 of the head 314. The length of the cylindrical shaft from the end surface 310 to the under head surface 312 is slightly greater than the axial length of the tie block between first end portion 210 and second end portion 212. This may allow axial movement of the tie block on the insert, depending on the configuration of the fastener element 400. The length of the cylindrical shaft in the illustrated example of the assembly can be used to affect the ease with which the tie block can be self-aligning or otherwise pivoting or rotating.

The under head surface 312 on the head 314 has one dimension that extends laterally outward for at least part of the head to a diameter approximating an outer diameter of the shoulder section 206 of the tie block, and in the present example to an outer diameter greater than the distance between oppositely-facing side face walls 244 of the shoulder section. In other configurations, the diameter or outside dimension of the head 314 may be less than the distance between the side face walls 244 so there is no exposed edge on which a tie wrap could be scraped or shaved when inserted in an aperture where such head dimension extends. Also in the present example, the maximum diameter of the head 314 is less than the distance between opposite corners 232. Other dimensional configurations can be used, including while still providing an axial movement-limiting function to the tie block.

The head includes knurling 316 along arcuate portions 318 (FIG. 3). The knurling provides manual gripping surfaces so that a user can hold/turn the insert relative to another part or rest of the assembly or a support structure, for example to help in assembling the parts or starting installation of the assembly into a support structure. Other gripping surfaces can be used, including bumps, or other textures or structures.

In addition to knurling or similar surface configurations, the head 314 can also include wrenching flats 320 that can be used for manually gripping or applying a tool to the flats for holding or turning the insert relative to another part of the assembly or a support structure. Other holding or turning structures can be used on the head 314, additionally or alternatively.

Additional or alternative to holding or turning structures on an outside portion of the head 314, the head can also include holding or turning structures on an inside surface of the head. In the present example, an opening 322 is formed in the head 314 including hex surfaces 328 that can be used with an Allen wrench. Other holding or turning structures can be used, including structures for existing tools. Holding or turning structures can be used to assist in assembling the parts into a final assembly, to hand start installation of the assembly into a support, to remove the assembly from a support structure and/or to assist in disassembling parts.

In the illustrated example, the insert 300 (FIG. 4) includes a complete channel 330. In other configurations, the channel 330 can extend only partly from the end surface 310 into the interior of the cylindrical shaft, and the opening 322 may have an additional tapped portion which does not join the channel 330. In another example, the cylindrical shaft can include a different configuration for combining with a fastener element, such as a male-type connection configuration or another engagement configuration for engaging with a complementary portion of a fastener element.

The channel 330 is tapped to provide a thread 334 over the entire length. The threads can be used to engage complementary threads on fastener elements such as one or two mounting studs forming part of the assembly. The threads adjacent to the opening 322 can receive a mounting stud on an additional assembly, for example for stacking a second assembly on a first assembly.

In one configuration, the insert 300 is formed from a cylindrical body, for instance made of an aluminum alloy, and helicoil inserts 336 (shown schematically in FIG. 4) are installed in the channel 330 to provide complementary engagement surfaces for fastener elements. The helicoil inserts can be installed and perform according to conventional standards, including providing a locking engagement.

The fastener element in the form of the stud 400 (FIGS. 1-2, 4 and 8) in the illustrated example can be used to mount the assembly onto a support structure, provide holding or turning surfaces for helping to assemble parts and to install and remove the assembly from a support structure, provide an interface between a support structure and an adjacent tie block surface, and/or help to define a desired spacing for supporting a tie block, for example for allowing rotation of the tie block. In the illustrated embodiment, the stud 400 is a double-headed stud having a first threaded end portion 402 and a second threaded end portion 404 each threaded with male threads 406 complementary to the threaded portions of the insert 300. In the present example, either end of the double-headed stud can be used to mount the assembly into a threaded opening in a support structure or to secure the assembly together by threading into the channel 330 in the cylindrical shaft. Each of the first and second threaded end portions are sufficiently long to securely support the assembly on a support structure and to engage the cylindrical shaft to withstand expected loads on the assembly.

The stud 400 also includes a flange 416 that extends laterally outward, in the present example substantially normal to a central longitudinal axis of the stud. The flange is positioned at an approximate midpoint longitudinally of the stud. The flange includes a non-circular perimeter surface 418, though in other configurations the perimeter surface can be circular. In the present example, the perimeter surface 418 includes wrenching flats 420 (FIG. 8), which can be used to hold or move the stud and or the assembly, for example during assembly of the parts, installation or removal of the assembly from a support structure, or disassembly of the parts for maintenance or otherwise. Other noncircular geometries can be used in the alternative.

The flange has a first surface 408 facing the insert when the stud is engaging the insert. The first surface 408 extends outward to at least make contact with at least a portion of the end surface 310 of the insert when the stud is installed. Once assembled, secure contact between the second end 308 and the end surface 310 of the insert in combination with the selected length of the cylindrical shaft 302 relative to the axial length of the tie block can be used to determine the allowed axial movement for the tie block along the cylindrical shaft, and the freedom of rotation of the tie block about the shaft. For example when assembled, the tie block can be axially positioned between the head 314 and the flange 416 such that the tie block can contact the adjacent surfaces of the head and/or the flange. Parts of the tie block, for example the holding structures, can extend laterally outward of the insert and/or the flange, while still being positioned axially between them. The two metal components provide a reliable spacing 410 and 412 (FIGS. 5 and 6, respectively) for the tie block over the lifetime of the assembly. The sum of the magnitudes of the spacing 410 and 412 will generally be the difference between the length of the cylindrical shaft (from the end surface 310 to the under head surface 312) and the overall axial length of the tie block. The distance of closest approach for the surfaces 312 and 408 is greater in the present example than the longitudinal or axial length of the tie block. In other configurations, the second end 308 and the end surface 310 of the insert in combination with the selected length of the cylindrical shaft 302 relative to the axial length of the tie block can be used to determine a maximum axial movement for the tie block along the cylindrical shaft, where the axial movement of the tie block could be less by use of a washer or other intermediate structure placed between the tie block and the head 314 or between the tie block and the flange first surface 408 limiting axial movement of the tie block. For example, the tie block can be positioned between the head 314 and the flange 416 such that the tie block can move to be adjacent the head 314 and/or the flange 416 without contacting the adjacent surfaces of the head and/or the flange. In these configurations, the spacing for the tie block between the head 314 and the flange 416 determines the maximum spacing for accommodating or positioning the tie block between them.

In the illustrated example, the first surface 408 extends to the outer perimeter of the cylindrical shaft 302, which helps to provide a secure assembly between the stud and the insert. In other configurations, the first surface can extend less than the complete distance to the outer perimeter of the cylindrical shaft. Also in the illustrated example, the first surface 408 extends laterally outward to the second end portion 212 of the tie block, and in the present example includes at least a portion that extends beyond the end portion 212 and a portion that extends less than a maximum outside dimension of the tie block. Extending beyond the perimeter of the end portion 212 limits movement of the tie block in a second direction opposite a first direction toward the head 314 of the insert, and helps to insulate the adjacent area of the tie block from nearby objects.

The flange 416 also includes a second surface 414 facing toward a structural support surface when the assembly is installed on the structural support. The second surface 414 bears against the facing surface of the structural support, and also provides a buffer or intermediate surface between the support structure and the nearby surface of the tie block. The second surface 414 helps to eliminate any effect of the surface configuration of the support structure on the ability of the tie block to rotate or self-align.

In the present example, the first and second surfaces are formed on the flange element 416. In other configurations, the first and second surfaces may be formed on discreet, separate structures.

Figure 9:
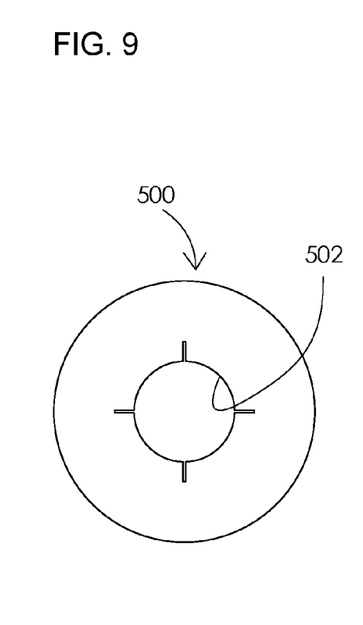
FIG. 9 is a top plan view of a washer for use on a fastener component such as that illustrated in FIG. 8.

The stud 400 may also include one or a plurality of surfaces for receiving and supporting a disk, washer or other element, such as a washer 500 (FIG. 9). In the present example, the stud includes first and second grooves 422 and 424 (FIG. 8), representing reduced diameter circumferential surfaces between the respective set of threads 406 and the adjacent surfaces 408 and 414, respectively. The washer 500 can be a nylon washer that can be used adjacent the second surface 414 of the stud to reduce the possibility of marring of a surface of the support structure. The washer includes an opening 502, for example having an inside diameter less than the outside diameter of threads 406 but greater than or equal to the outside diameter of the grooves 422 and 424.

The stud may be formed from a number of materials. In the present example, the stud is formed from a stainless steel, for example 300 series CRES. Other materials may also be used, depending upon application.

In another configuration of components for a tie wrap anchor assembly, an insert 300 can be configured such that the threaded portion at the second end 308 is replaced by a smooth bore having a smaller diameter at the second opening with a second, counterbore having a larger diameter interior to the smaller smooth bore. A substitute fastener element has one of the threaded shank portions replaced by a smooth shank terminating at an enlarged ball (not shown). The enlarged ball has an outside diameter greater than the smaller diameter of the smooth bore in the insert, and less than or equal to the larger diameter of the second counterbore. The parts are assembled by placing the tie block over the cylindrical shaft of the insert, and inserting the enlarged ball of the fastener element into the smaller diameter smooth bore of the insert, in interference fit, until the ball enters the larger diameter counterbore. The transition between the larger diameter counterbore and the smaller diameter smooth bore supports the substitute fastener element.

In an alternative configuration, a ball and shank can be positioned on a second portion of an insert opposite a first portion, and a fastener element can have one threaded end and a second end with a hollow cylinder with a small-diameter bore smaller than the diameter of the ball and a larger diameter counterbore having a diameter greater than or equal to the diameter of the ball, functioning in the same manner as described above.

In a further configuration, a tie wrap block such as those described herein can be configured to be supported by an insert where the threaded portion at the second end portion of the insert is replaced by a male threaded element, and one male threaded portion of the double-headed stud is replaced by a female threaded cylinder on a side of the flange opposite the male threaded stud element. The first end portion of the insert can retain its female threaded opening, for example to permit stacking of a plurality of tie wrap anchor assemblies.

The respective parts can be assembled from individual parts or from a kit to form a tie wrap anchor assembly. A kit may include, for example, a tie block, an insert and a stud or other fastener, such as any of those described or illustrated herein. A tie block 200 is positioned over an insert 300 so that the cylindrical shaft 302 of the insert extends into the passageway 220 of the tie block. The tie block and the insert are joined until the top surface 208 contacts the under head surface 312 on the head of the insert, or until the threaded portion in the channel 330 of the insert is accessible to the double-headed stud. A threaded male portion on the stud is threaded into the channel of the insert until the first surface 408 on the flange 416 contacts and securely seats against the end surface 310 on the insert 300, thereby defining the closest approach to each other of the under head surface 312 of the insert and the surface 408 on the flange of the fastener.

Threading can be carried out manually using the knurling and/or flats on the head 314 of the insert and the flats on the flange 416. Once assembled, the assembly can be packaged for shipment, assembled onto a cable bundle or other structure using one or more tie wraps, and/or installed onto a support structure and a cable bundle or other structure applied using one or more tie wraps. Where the tie block is rotatable about the insert, the tie block in the assembly is self-aligning. The assembly can be removed from the support structure using one or more of the wrenching surfaces or manual surfaces, and parts of the assembly can be disassembled using the same surfaces. Having manual or tool receiving surfaces on each component of the assembly provides more flexibility in handling the assembly and its component parts.

Figure 10:
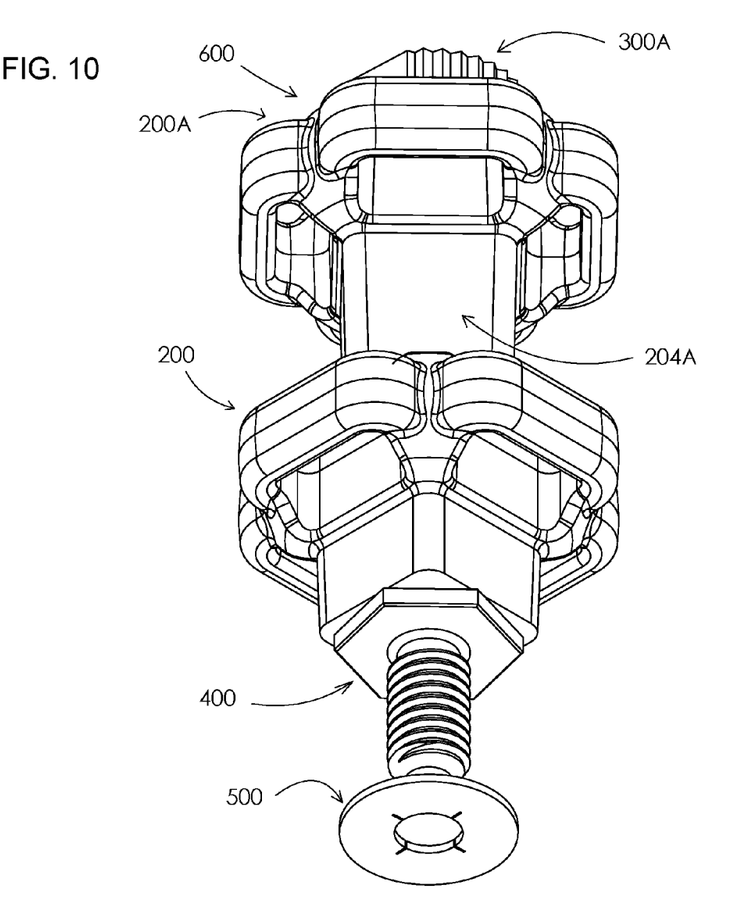
FIG. 10 is a lower isometric view of another example of a tie wrap anchor assembly.

In another example of a tie wrap anchor assembly (FIGS. 10-12), a plurality of tie blocks can be assembled in a stacked arrangement. In an example where components have structures and functions identical or similar to those previously described, such components are numbered identically. In an example of a stacked arrangement, a tie wrap anchor assembly 600 includes a tie block 200 and a tie block 200A. The tie block 200A is identical to the tie block 200 except for having a longer stem 204A. The structures and functions of the tie blocks 200 and 200A are otherwise identical. The tie block 200 and the tie block 200A are mutually independently rotatable in the assembly, and independently self-aligning.

Figure 11:
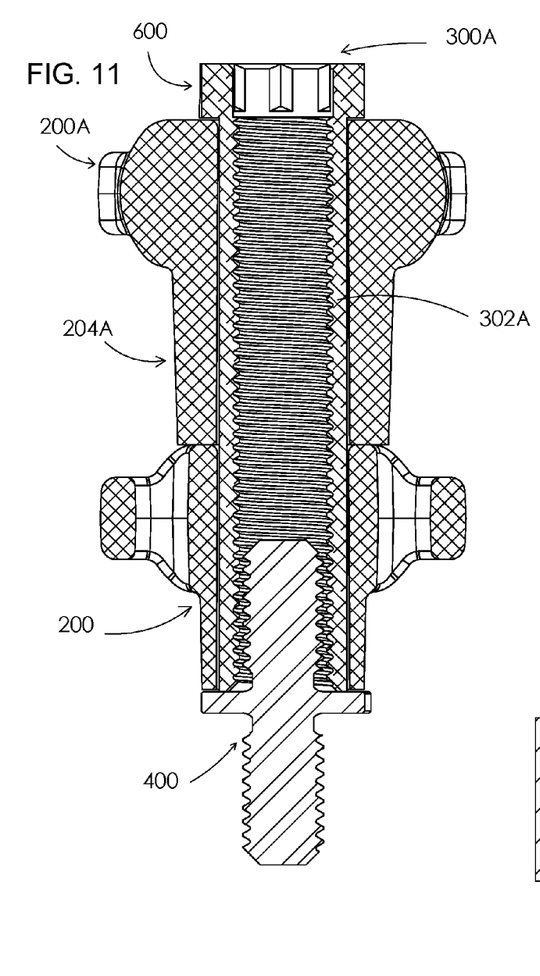
FIG. 11 is a longitudinal cross section of part of the assembly of FIG. 10.
Figure 12:
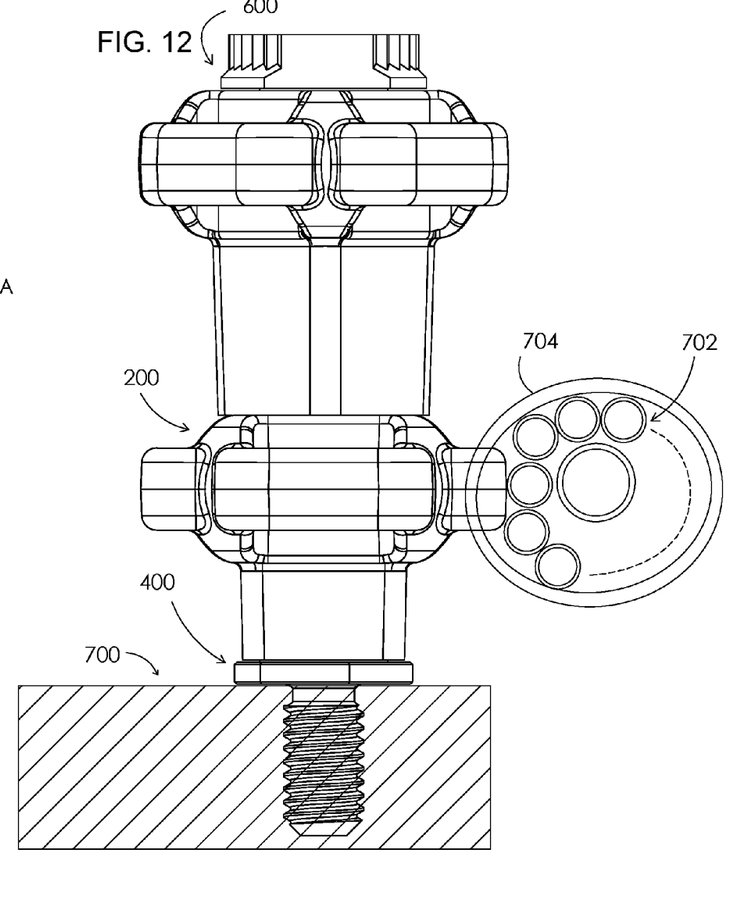
FIG. 12 is a schematic and side elevation view of a tie wrap anchor assembly supported by a support structure and supporting a tie wrap securing a bundle.

The assembly includes an insert 300A, substantially identical to the insert 300 except for a longer cylindrical shaft 302 A (FIG. 11). The insert may include desired helicoil inserts, not shown in FIG. 11 for ease of illustration. If desired, the cylindrical shaft 302A can be threaded only over those portions requiring complementary threads for engaging fasteners inserted therein, the remainder of the passageway being unthreaded. In another alternative, an intermediate portion of the interior of the cylindrical shaft can be solid, with only those portions of the end portions having the desired bores and any desired threading or other engagement surfaces complementary to the components to be used with the insert 300A.

The stacked and independently self-aligning assembly 600 can be mounted on a suitable support structure 700 (FIG. 12), having a threaded opening for receiving a complementary threaded end of the stud 400. A cable bundle 702 is supported through one of the apertures on the tie block 200 with a tie wrap 704. The cable bundle can be secured on the assembly after the assembly is secured into the support structure 700, or the cable bundle can be secured to the assembly 600 as a subassembly, before the subassembly of the cable bundle and respective tie wrap anchor assemblies 600 are installed on a support structure.

What is claimed is:

1. A tie wrap anchor assembly comprising:
   a tie block extending along an axis between a first end and a second end with a passageway between the first and second tie block ends, and at least one holding structure extending outward of the tie block defining an aperture for receiving a tie wrap;
   a fastener element having a first threaded end portion, a second end portion opposite the first threaded end portion, and a flange extending substantially transverse to an axis extending between the first and second end portions;
   an insert having an external surface configured to extend within the passageway of the tie block from the tie block first end toward the tie block second end, wherein the insert includes a first insert end and a second insert end opposite the first end and at least one of the first and second ends of the insert includes an opening extending axially of the insert, the first insert end including a head extending laterally outward of the insert, wherein the second end of the insert is configured for receiving at least one of the fastener element end portions; and
   wherein the fastener element flange and the insert head are spaced apart sufficiently that the tie block is axially positioned between the fastener element flange and insert head and a tie block movement is limited along its axis by the fastener element flange and the insert head.

2. The assembly of claim 1 wherein the passageway in the tie block is substantially cylindrical and has an inside dimension greater than an outside dimension of the insert such that the tie block is rotatable relative to the insert.

3. The assembly of claim 1 wherein the tie block includes a plurality of holding structures defining respective apertures for receiving a respective tie wrap, wherein the plurality of holding structures are substantially symmetrically arranged relative to each other on the tie block.

4. The assembly of claim 1 wherein the tie block includes a stem having a rectangular cross-section with four corners and four sidewalls.

5. The assembly of claim 1 wherein the second end portion of the fastener element includes a threaded portion.

6. The assembly of claim 1 wherein the fastener element includes a surface for receiving a disc having a wall for engaging a surface on the flange of the fastener element.

7. The assembly of claim 1 wherein the flange on the fastener element includes surfaces configured to assist in turning the fastener element.

8. The assembly of claim 1 wherein the flange on the fastener element includes an outer dimension greater than an outer dimension of the second end portion of the tie block.

9. The assembly of claim 1 wherein the head on the first end portion of the insert includes at least one wrenching portion.

10. The assembly of claim 1 wherein at least one of the openings in the insert includes at least one surface for retaining a corresponding surface on the fastener element.

11. The assembly of claim 10 wherein the at least one surface for retaining a corresponding surface on the fastener element includes at least one of a tapped surface and an annular shoulder.

12. The assembly of claim 1 wherein each of the openings in the first and second end portions of the insert includes respective helicoil inserts.

13. The assembly of claim 1 wherein the head of the insert and the flange of the fastener element are adapted together to limit axial movement of the tie block.

14. A method of assembling a tie wrap anchor assembly comprising:
   positioning a tie block having a passageway and holding structures for receiving respective tie wraps about an insert so that a longitudinally extending portion of the insert extends into the passageway and so that a surface on the tie block can contact a laterally extending surface on the insert; and
   engaging a fastener element with the insert so that a laterally extending surface on the fastener element is on a side of the tie block opposite the laterally extending surface on the insert.

15. The method of claim 14 further including threading the fastener element into the insert.

\* \* \* \* \*